United States Patent
Miller et al.

(10) Patent No.: US 9,462,814 B1
(45) Date of Patent: Oct. 11, 2016

(54) ROCKER CHILLER WITH DRIVE-SHAFT CARCASS DEFLECTORS

(71) Applicant: Morris & Associates, Inc., Garner, NC (US)

(72) Inventors: Garry L. Miller, Charleston, SC (US); Robert E. Cathey, Apex, NC (US); Terry A. Wright, Cary, NC (US)

(73) Assignee: Morris & Associates, Inc., Garner, NC (US)

( * ) Notice: Subject to any disclaimer, the term of this patent is extended or adjusted under 35 U.S.C. 154(b) by 0 days.

(21) Appl. No.: 15/073,435

(22) Filed: Mar. 17, 2016

Related U.S. Application Data

(63) Continuation of application No. 13/347,309, filed on Jan. 10, 2012, now Pat. No. 9,295,270.

(51) Int. Cl.
*F25D 17/02* (2006.01)
*A22B 5/00* (2006.01)
*A23B 4/06* (2006.01)
*F28C 3/00* (2006.01)
*F28F 5/00* (2006.01)

(52) U.S. Cl.
CPC ............. *A22B 5/0076* (2013.01); *A23B 4/062* (2013.01); *F28C 3/005* (2013.01); *F28F 5/00* (2013.01)

(58) Field of Classification Search
CPC .......... F25B 3/11; F25B 25/00; F28D 15/00; A23G 9/04; A23B 4/064; A23B 5/0076
See application file for complete search history.

(56) References Cited

U.S. PATENT DOCUMENTS 1,735,393 A  11/1929  Stanley
1,942,307 A  1/1934  Reeh
(Continued)

FOREIGN PATENT DOCUMENTS

GB  1278602 A  6/1972

OTHER PUBLICATIONS

Shell Exhibit 1: Drag Chiller, Retrieved Date: May 9, 2011, From URL: http://www.morris-associates.com/page/drag_chiller, 4 pages.
(Continued)

*Primary Examiner* — Allen Flanigan
*Assistant Examiner* — Kun Kai Ma
(74) *Attorney, Agent, or Firm* — Myers Bigel & Sibley, P.A.

(57) ABSTRACT

A rocker chiller includes a tank having a bottom wall and a dasher assembly, which includes an axle extending in a lengthwise direction and a dasher blade extending adjacent the bottom wall. The dasher blade is mechanically coupled to the axle by a plurality of support arms extending in a radial direction between the axle and the dasher blade. A carcass deflector is provided, which is attached to the axle so that each back-and-forth oscillation of the axle and dasher blade during operation of the rocker chiller causes a back-and-forth oscillation of the carcass deflector in unison with the back-and-forth oscillation of the axle and dasher blade. The carcass deflector is spaced longitudinally along a longitudinal axis of the axle and has a carcass deflection region therein that extends above a top surface of the axle and in a plane that is generally orthogonal to the longitudinal axis of the axle.

3 Claims, 3 Drawing Sheets

(56) References Cited

U.S. PATENT DOCUMENTS

| | | | |
|---|---|---|---|
| 2,039,276 A * | 5/1936 | Ayars | A23N 12/02 134/126 |
| 2,164,277 A | 6/1939 | James | |
| 2,635,284 A * | 4/1953 | Hunt | A22C 21/02 134/7 |
| 2,722,505 A | 11/1955 | Seymour | |
| 3,004,407 A | 10/1961 | Morris, Jr. | |
| 3,022,646 A | 2/1962 | Zebarth | |
| 3,097,501 A * | 7/1963 | Pappas | A23B 4/062 62/375 |
| 3,240,026 A * | 3/1966 | Van Dolah | A23B 4/062 62/374 |
| 3,250,086 A | 5/1966 | Morris, Jr. | |
| 3,340,696 A * | 9/1967 | Zebarth | A23B 4/062 62/375 |
| 3,407,872 A | 10/1968 | Crane | |
| 3,410,101 A * | 11/1968 | Morris, Jr. | A23B 4/062 165/87 |
| 3,426,546 A * | 2/1969 | Crane | A23B 4/062 62/375 |
| 4,860,554 A | 8/1989 | Innes et al. | |
| 4,875,344 A | 10/1989 | Zittel | |
| 5,456,091 A | 10/1995 | Zittel | |
| 5,484,615 A | 1/1996 | Kounev | |
| 5,868,000 A | 2/1999 | Morris, Jr. et al. | |
| 6,214,400 B1 | 4/2001 | Zittel et al. | |
| 6,279,328 B1 | 8/2001 | Leeds | |
| 6,301,905 B1 | 10/2001 | Gallus | |
| 6,308,529 B1 | 10/2001 | Bass | |
| 6,397,622 B1 | 6/2002 | Miller et al. | |
| 6,658,886 B1 | 12/2003 | Bass | |
| 7,174,724 B2 | 2/2007 | Morris, III et al. | |
| 7,470,173 B2 | 12/2008 | Morris, III et al. | |
| 7,588,489 B2 | 9/2009 | Morris, III et al. | |
| 2006/0225439 A1 | 10/2006 | Morris et al. | |
| 2007/0169502 A1 * | 7/2007 | Morris | A22B 5/0076 62/374 |
| 2009/0241583 A1 * | 10/2009 | Cathey | A22B 5/0076 62/375 |

OTHER PUBLICATIONS

Shell Exhibit 2: Morris & Associates Heavy Duty Rocker Chiller, Date unknown but prior to filing, 2 pages.

Shell Exhibit 3: Brochure titled Positive Control Chiller, Simon-Johnson, Date unknown but prior to filing, 4 pages.

Shell Exhibit 4: Brochure titled Giblet Chiller, Cantrell, © 2016, Retrieved from: http://www.cantrell.com/equipment/chilling/giblet-chiller/, Date unknown but prior to filing, 2 pages.

Shell Exhibit 5: Photograph of a dasher assembly for a baker spin chiller, Date unknown but prior to filing, 1 page.

Proline Grader by Marel, © 1999-2011, Retrieved Date: Oct. 7, 2011, From URL: http://www.marel.com/systems-and-equipment/poultry/Grading-and-Batching/Proline-Gra . . . , 1 page.

* cited by examiner

ROCKER CHILLER WITH DRIVE-SHAFT CARCASS DEFLECTORS

REFERENCE TO PRIORITY APPLICATION

This application is a continuation of U.S. application Ser. No. 13/347,309, filed Jan. 10, 2012, now U.S. Pat. No. 9,295,270, the disclosure of which is hereby incorporated herein by reference.

FIELD OF THE INVENTION

This disclosure generally concerns a rocker chiller for reducing the temperature of poultry carcasses as they come off the processing line in a poultry processing plant. The rocker chiller includes an elongated tank with a semi-cylindrical bottom wall containing heat exchanging liquid, and a dasher that oscillates across the bottom wall to impart turbulence in the heat exchanging liquid and among carcasses so as to increase the rate of temperature change in the carcasses.

BACKGROUND OF THE INVENTION

In the poultry processing industry, usually there is a requirement that after preliminary processing, the eviscerated poultry carcass must be chilled prior to secondary processing or packaging for storage and shipment. A variety of mechanisms have been developed to achieve this chilling step, each with its own advantages and operational challenges. One such method is generically referred to as a rocker chiller. In such a chiller, a dasher oscillates within a semi-cylindrical tank to keep the carcasses stirred up in the heat exchanging liquid within the tank. Warm carcasses are added to the tank at one end and give up heat to the liquid in the tank as they migrate down the length of the tank. Cooler carcasses are removed at the opposite end of the tank.

It is desired that carcasses processed in a rocker chiller progress at a steady rate along the length of the chiller. The press of fresh product being added at the inlet pushes carcasses in the chiller toward the outlet end where space is created by removal of product from the tank. In this way, all carcasses should spend the same amount of time in the chiller and exit at similar temperatures. Ideally, the dasher moves carcasses from side to side in the tank, but does not displace them in the axial direction in a manner that would advance one carcass ahead of another in the sequence of progression through the tank. However, in some cases, the motion of the dasher creates surges that move carcasses back and forth along the axial dimension of the tank. In this situation, some carcasses inevitably advance faster than others resulting in a range of residence times and consequently a range of carcass temperatures at the exit. It is an intent of the current invention is to constrain the movement of carcasses through the chiller in a way that minimizes the variance of time the carcasses spend in the chiller.

SUMMARY OF THE DISCLOSURE

A rocker chiller is described herein that includes deflectors to constrain the axial movements of carcasses within the chiller while promoting their transverse movements. The rocker chiller includes a tank typically semi-cylindrical in form and containing a heat exchanging liquid. A dasher assembly is situated along the length of the tank. The dasher assembly includes a drive shaft approximately concentric with the longitudinal central axis of the tank and a dasher blade positioned closely adjacent to the inside bottom surface of the tank. Support arms extend from the drive shaft and are connected to the dasher blade to form the dasher assembly. Power means are connected to the drive shaft and move the dasher in an oscillatory motion such that the dasher blade moves adjacent the bottom of the tank and agitates and lifts the liquid and the carcasses in the tank.

One end of the tank is the inlet end where carcasses are added from above the tank. The other end is the outlet end where carcasses are removed from the tank. Typically, an unloading device is mounted within the tank at the unloading end to lift carcasses above the upper edge of the tank for removal.

Within the tank of the rocker chiller, side deflectors are supported at intervals adjacent the side walls and extend toward the interior of the tank. These side deflectors extend on the order of about half way from the side walls to the drive shaft. The side deflectors do not have to extend into the bottom of the tank where the dasher blade sweeps in its oscillations. Additionally, central deflectors extend from the drive shaft and extend outwardly to approximately half way to the tank wall. The side deflectors and central deflectors may be spaced at intervals along the length of the tank in an alternating pattern such that each central deflector is generally between two side deflectors, and vice versa. Naturally, any deflector at the end of such a sequence will not be located between two of the opposite type. The side deflectors and central deflectors may have openings that allow liquid to pass through them but carcasses cannot pass through. The liquid flow through the deflectors tends to control the velocity of transverse movements of the liquid and the carcasses.

The side and central deflectors define serpentine paths on opposite sides of the longitudinal axle which carcasses are somewhat constrained to follow as they migrate from the inlet of the chiller toward the outlet end. As a carcass moving axially along the side wall of the tank approaches a deflector, it will be constrained to slow the longitudinal movement and follow the movement of the liquid toward the center of the tank as the carcass cannot pass through the deflector. Likewise, a carcass adjacent the drive shaft and tending to move parallel to the drive shaft will be constrained to move out toward the side wall when the carcass approaches a central deflector. The above described carcass movements follow generally serpentine paths along the length of the tank on both sides of the drive shaft. Constraining the carcasses to follow the narrow serpentine paths through the deflectors limits the opportunity for one carcass to move ahead of others in the progression toward the outlet end.

A benefit of the rocker chiller is the capacity to keep carcasses stirred in the heat exchanging liquid. This capability is not impeded by the deflectors, since they allow unrestricted transverse motion of carcasses. The deflectors constitute obstacles that prevent carcasses from moving very far in an axial direction before being constrained to move in a transverse direction. Conversely, the orientation of deflectors allow carcasses nearly unrestricted freedom to move in the transverse direction in response to the urging of the dasher oscillations.

Other features and advantages of this invention will become apparent upon reading the following specification, when taken in conjunction with the accompanying drawings.

DETAILED DESCRIPTION

Figure 1:
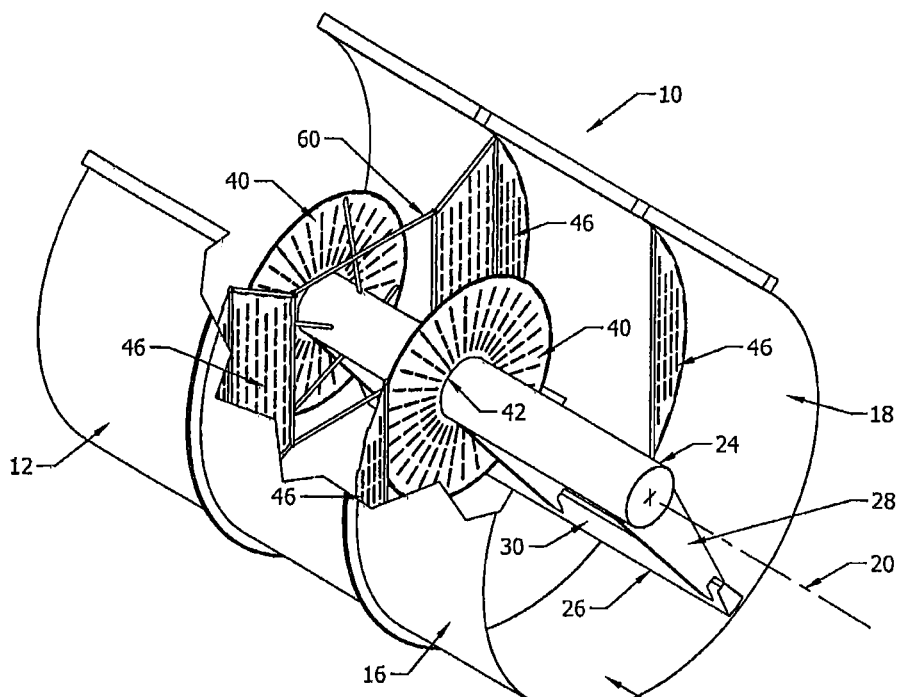
FIG. 1 is a perspective view of a cut-away portion of a rocker chiller, showing the semi-cylindrical tank and the dasher, with the deflectors placed in the tank and on the shaft of the dasher.
Figure 4:
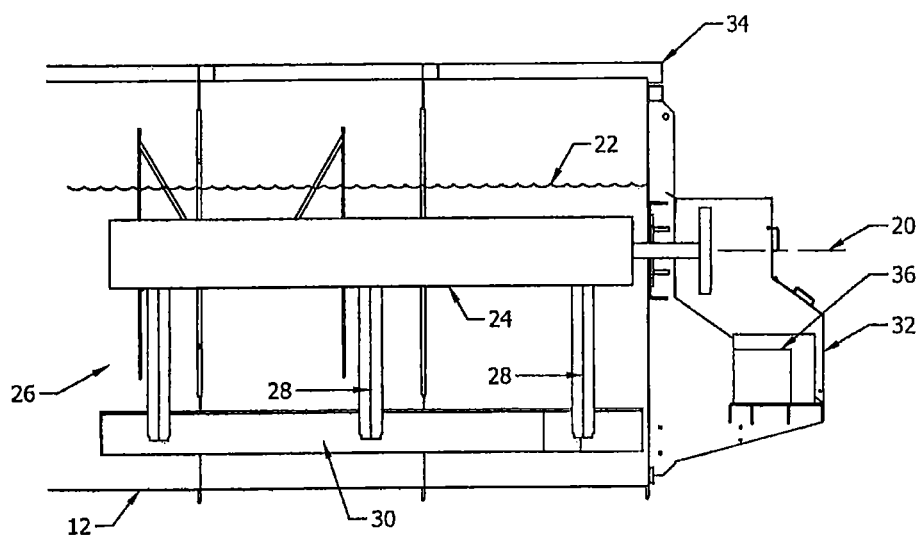
FIG. 4 is a side cross-sectional view of a portion of the rocker chiller of FIG. 1.

Referring now in more detail to the drawings, in which like numerals indicate like parts throughout the several views, FIG. 1 is a perspective view of a portion of the rocker chiller 10 that includes an elongated tank 12 having a semi-cylindrical bottom wall 14 and upwardly extending side walls 16 and 18. The semi-cylindrical bottom wall 14 extends about longitudinal axis 20, and the upwardly extending side walls 16 and 18 may also extend about the longitudinal axis 20. The elongated tank 12 is shaped and dimensioned so as to contain a predetermined amount of heat exchanging liquid, with the liquid level 22 illustrated in FIGS. 2 and 4. The liquid level 22 typically will be higher than the longitudinal axis 20 of the tank 12.

Figure 5:
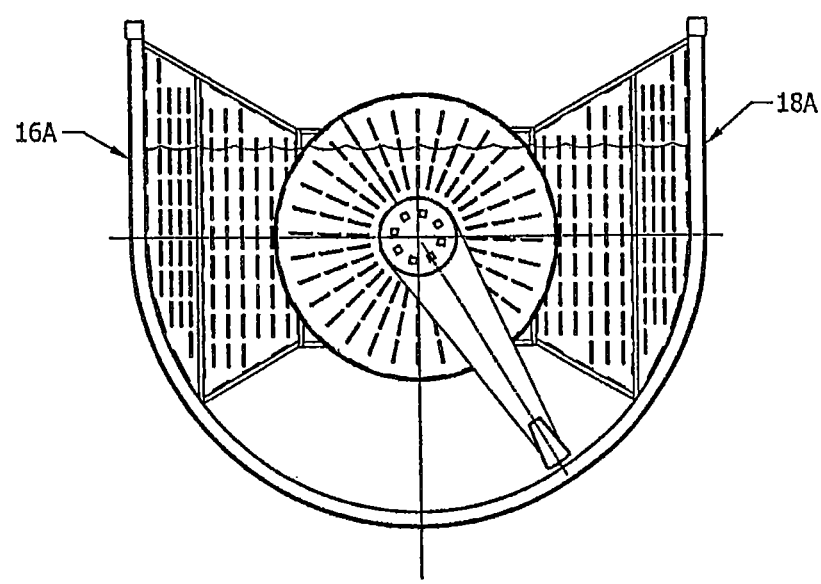
FIG. 5 is an end view of a rocker chiller, similar to FIG. 2, but showing the elongated tank having a semi-cylindrical bottom wall and flat, upwardly extending side walls.

As shown in FIG. 5, the elongated tank of the rocker chiller can have upwardly extending opposed side walls 16A and 18A that are not semi-circular but are substantially flat, or may be of other shapes compatible with the functions and capacity of the rocker chiller as may be desired.

As shown in FIG. 1, longitudinal axle 24 may be coextensive with longitudinal axis 20, and dasher assembly 26 is mounted to the longitudinal axle 24. Dasher assembly 26 includes support arms 28 rigidly mounted at their upper ends to longitudinal axle 24, and dasher blade 30 is mounted to the distal ends of the support arms 28.

Figure 3:
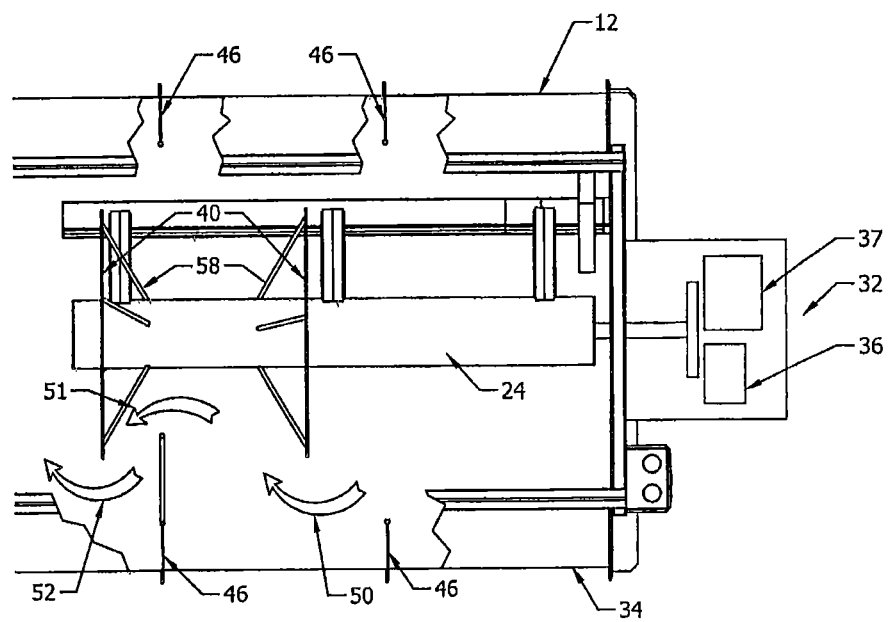
FIG. 3 is a partial top view of the rocker chiller of FIG. 1.

As shown in FIG. 3, power means 32 is mounted to the inlet end 34 of the elongated tank 12. The power means 32 may comprise an electric motor 36 mounted to a gear reducer (not shown) and an oscillatory lever that, in turn, is connected to the longitudinal axle 24. A power means suitable to operate the dasher is disclosed in more detail in co-pending U.S. application Ser. No. 13/070,521, which is incorporated herein in its entirety by reference. Other power means may be used, if desired.

Figure 2:
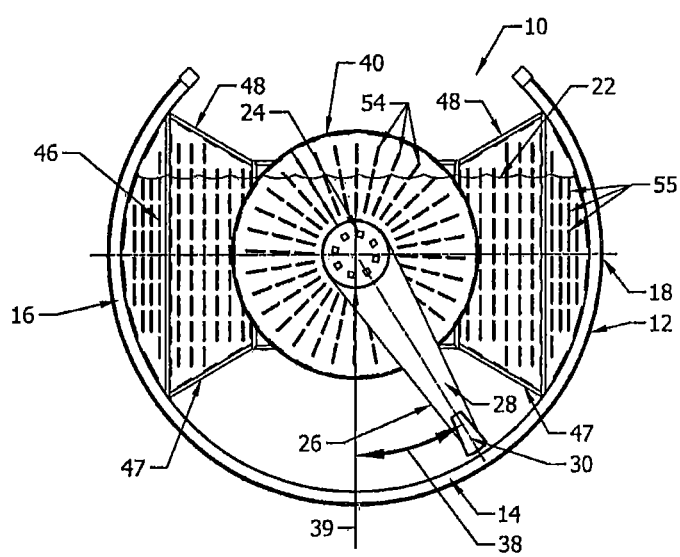
FIG. 2 is a cut-away end view of the rocker chiller of FIG. 1.

As shown best in FIG. 2, the power means 32 functions to oscillate the dasher assembly 26 as indicated by the double-headed arrow 38. The oscillation of the dasher assembly usually will have an amplitude across the semi-cylindrical bottom wall 14 in an arc of about 30.degree. on opposite sides of the vertical plane 39 through the longitudinal axis 20. This results in a sweep of approximately 60.degree. across the semi-cylindrical bottom wall 14. The dasher blade 30 sweeps closely adjacent the inwardly facing semi-cylindrical bottom wall 14, thereby moving the heat exchanging liquid and carcasses in that vicinity along the semi-cylindrical causing turbulence in the water and among the carcasses so as to enhance the heat exchange between the liquid and carcasses in the tank.

As shown in FIGS. 1 and 2, a series of central deflectors 40 are mounted to the longitudinal axle 24. The central deflectors 40 may be disk-shaped with a central opening 42 that is mounted about the longitudinal axle 24 and the central deflectors 40 are spaced along the length of the longitudinal axle 24. When the longitudinal axle 24 oscillates as described above, the central deflectors will also oscillate in unison with the longitudinal axle. The central deflectors 40 of FIGS. 1-2 and 5, which may be formed in other shapes that are compatible with the functions of the rocker chiller, are configured to continuously intersect, without interruption, a surface of the body of heat exchanging liquid regardless of a position of said elongated paddle/blade 30 during the full range of back-and-forth motion of the paddle/blade 30.

A series of side deflectors 46 may be mounted to the inwardly facing surface of the upwardly extending side walls 16 and 18. The side deflectors are spaced from each other and are offset longitudinally with respect to the central deflectors 40. The side deflectors 46 may be of different sizes from one another and they are substantially flat and are directed inwardly from the upwardly extending side walls 16 and 18 to rd the longitudinal axle 24.

Both the central deflectors and side deflectors extend normal to the longitudinal axis 20 of the elongated tank 12. Since the central deflectors and side deflectors 40 and 46 are offset from one another, serpentine paths are formed in the elongated tank 12, as generally shown by the arrows 50, 51 and 52 in FIG. 3. Since there are side deflectors on both sides of the elongated tank, and since the central deflectors radiate outwardly from both sides of the longitudinal axle 24, the serpentine paths 50-52 are formed on both sides of the longitudinal axle.

As shown in FIG. 2, both the central deflectors 40 and side deflectors 46 include small openings 54 and 55, respectively, and some of the heat exchanging liquid passes through the openings. However, the openings 54 and 55 are too small to allow the poultry carcasses to pass therethrough. The small openings 54 and 55 may be adjusted in size and positions so as to allow a predetermined amount of liquid to pass therethrough, and therefore requiring the other portions of the liquid moving axially along the tank to pass inwardly and then outwardly in serpentine paths about the central deflectors and the side deflectors 40 and 46 respectively.

It will be noted from FIG. 2 that the side deflectors 46 do not extend downwardly into the range of motion of the dasher blade 30. Longitudinal positions of deflectors 46 and support arms 28 can be offset to avoid interference. Therefore, the side deflectors do not inhibit the oscillatory movement of the dasher assembly 26.

As shown in FIG. 3, in order to maintain the central deflectors 40 in position, support rods 58 may be mounted at their ends between the longitudinal axle 24 and the central deflectors 40. Likewise, as shown in FIG. 1, horizontal support bars 60 may extend across the longitudinal axis 20 of the tank between side deflectors 46 so as to stabilize the positions and orientations of the side deflectors.

Poultry carcasses or other relatively warm work products enter the elongated tank 12 at the inlet end, usually from the discharge of a surface conveyor or other carcass feed system. The carcasses tend to accumulate in the liquid at the inlet end of the rocker chiller, but as more carcasses are added, the later entering carcasses tend to urge the prior carcasses axially away from the inlet end 34 on down the length of the elongated tank. In the meantime, the dasher assembly 26 is active and oscillates as shown by the double-headed arrow 38 of FIG. 2, usually in an arc of about 60° across the inside surface of the semi-cylindrical bottom wall 14 of the tank. Since the carcasses usually have a specific gravity of 1.1, they tend to sink in the heat exchange liquid. However, the turbulence induced in the heat exchanging liquid by the dasher assembly is sufficient to distribute carcasses uniformly throughout the heat exchanging liquid. As shown in FIG. 2, central deflectors 40 and side deflectors 46 jointly span well over half the sectional area of heat exchanging liquid and consequently engage the majority of carcasses in the tank 12. In particular, as shown by the horizontal centerline illustrated by FIGS. 2 and 5, a summation (Σ) of a lateral width of the central deflector 40, a lateral width of a "left" side deflector 46 and a lateral width of a "right" side deflector 46, as measured at the height of the axle 24, is greater than a lateral width of the tank 12 at the height of the axle 24.

Since more carcasses are added to the heat exchanging liquid, there is a tendency for the entering carcasses to urge the previously entered carcasses axially of the elongated tank, and about the central deflectors and side deflectors, along the serpentine paths as illustrated in FIG. 3.

Due to the serpentine movement of the carcasses through the elongated tank, the carcasses tend to move a longer distance through the heat exchange liquid as they move from the entrance end 34 toward the discharge end (not shown). Therefore, the carcasses are required to move through longer paths through the heat exchanging liquid than they would otherwise move if the deflectors were not in place.

Because of the density of the carcasses in the tank, some of the carcasses may move across the longitudinal axle 24 to the other side of the tank, causing more turbulence and tendency for increased heat exchange between the heat exchange liquid and the carcasses.

In effect, the serpentine paths enhance lateral movement of the carcasses and reduces the out-of-order movement of the carcasses longitudinally of the tank, generally resulting in the carcasses having a more uniform time and turbulence in passing through the tank, resulting in more predictable temperatures of the carcasses and with the temperatures of the carcasses in a narrower range of temperatures at the delivery end of the tank.

It is likely that the carcasses will move an average of between 1 and 2 inches along the length of the tank while the dasher assembly completes a cycle of back and forth sweeps across the cylindrical bottom wall of the elongated tank. Further, it is noted that when the dasher is moving upwardly on one side of the tank, the water level on that side of the tank tends to rise along with the carcasses submerged on that side of the tank, which results in the movement of some of the liquid and carcasses across the longitudinal axle 24, as described above.

While the longitudinal axle 24 may extend entirely through the elongated tank, the dasher blade 30 and support arms 28 may terminate short of the delivery end of the elongated tank 12, leaving an area in the tank having more space to accommodate the heat exchanging liquid and carcasses.

It should be understood that the above described embodiment of the present poultry rocker chiller is an example of implementation of the invention disclosed herein, to set forth a clear understanding of the principles of operation and construction thereof. Variations and modifications may be made to the above described rocker chiller without departing from the spirit and principles of the invention disclosed herein and as set forth in the following claims.

That which is claimed is:

1. A rocker chiller, comprising:
   a tank configured to hold a body of heat exchanging liquid therein, said tank including a concave-shaped bottom wall;
   a dasher assembly including an axle extending in a lengthwise direction across at least a portion of said tank and a dasher blade extending in the lengthwise direction adjacent the concave-shaped bottom wall, said dasher blade mechanically coupled to the axle by a plurality of support arms extending in a radial direction between the axle and the dasher blade; and
   at least a first carcass deflector fixedly attached to the axle so that each back-and-forth oscillation of the axle and dasher blade during operation of the rocker chiller causes a corresponding back-and-forth oscillation of the first carcass deflector in unison with the back-and-forth oscillation of the axle and dasher blade, said first carcass deflector: (i) spaced longitudinally along a longitudinal axis of the axle relative to all of the plurality of support arms so that no direct contact is present between the first carcass deflector and any of the plurality of support arms and (ii) having a carcass deflection region therein that extends above a top surface of the axle and in a plane that is generally orthogonal to the longitudinal axis of the axle.

2. The rocker chiller of claim 1, wherein the carcass deflection region is configured to extend and remain above a top surface of the body of heat exchanging liquid during the back-and-forth oscillation of the axle and dasher blade.

3. The rocker chiller of claim 2, wherein the carcass deflection region is configured to intersect, without interruption, the top surface of the body of heat exchanging liquid during the back-and-forth oscillation of the axle and dasher blade.

* * * * *